Nov. 10, 1942.  C. A. POLLAK ET AL  2,301,228
LIGHTING SYSTEM
Filed March 16, 1940  7 Sheets-Sheet 5

INVENTORS
Charles A. Pollak
Rudolph C. Hultgren
BY
McLaughlin & Wallenstein
ATTORNEYS

Nov. 10, 1942.   C. A. POLLAK ET AL   2,301,228
LIGHTING SYSTEM
Filed March 16, 1940   7 Sheets—Sheet 7

INVENTORS
Charles A. Pollak
Rudolph C. Hultgren
BY
McLaughlin & Wallenstein
ATTORNEYS Patented Nov. 10, 1942

2,301,228

UNITED STATES PATENT OFFICE 2,301,228

LIGHTING SYSTEM

Charles A. Pollak and Rudolph C. Hultgren, Chicago, Ill., assignors to General Luminescent Corporation, Chicago, Ill., a corporation of Illinois Application March 16, 1940, Serial No. 324,328

24 Claims. (Cl. 240—1)

This invention relates to lighting systems of the type employing fluorescent tubes with the greater light output to power ratio obtainable with such fluorescent tubes. It relates more in particular to an improved fixture and support combination having greatly enhanced advantage and utility.

The development of commercially available electrical current has resulted in pronounced commercial and technological advances in the illumination fields. For the most part, this development has centered around the use of incandescent lamps, notwithstanding the fact that substantially contemporaneously with the concept of producing light through incandescence of a filament, it was suggested to take advantage of the properties of luminescence and fluorescence of various materials for lighting purposes. For a relatively great length of time, it has been known that there are certain advantages in utilizing the phenomenon of fluorescence in the illumination field; indeed, a relatively large proportion of the factual data with respect to luminescence and fluorescence was at hand before the incandescent lamp was developed to a fully satisfactory commercial stage.

Various factors have combined to cause the incandescent type of light to far outstrip lighting systems employing the phenomenon of fluorescence and the lighting industry in general has appreciated for a long period of time the types of problems involved. Some considerable progress has been made in overcoming these problems, but the development, at least in the last two or three decades, has been in the direction of employing conventional commercial voltages in space discharge tubes usually by some means which permits the utilization of a so-called hot cathode type of tube. The commercially available lighting systems utilizing the principle of fluorescence are of this type. There is no question but that the currently available commercial systems overcome some of the problems which the industry faced for a relatively long period of time, but the development of the system employing the hot cathode type of tube has been at the expense of advantages which should normally be retained. Those skilled in the art appreciate the compromise which has been required, and it will suffice to point out that the normal life of the present commercial tubes is considerably less than the normal life of a tube employing higher voltages.

The principal object of the present invention is to utilize fluorescent tubing for illumination purposes in a much more efficient manner than has heretofore been possible.

Another object is the provision of a fixture and mounting system adapted for substantially universal application where the tubing is to be mounted on or near the ceiling.

Another object is the provision of a lighting system wherein the cost of installation and maintenance is reduced to a minimum.

A still further object is the provision of a simplified fixture structure whereby to minimize initial cost and installation time.

The invention is particularly adapted for lighting commercial establishments such as stores, shops, public gathering places, and the like, although not necessarily limited to such uses. Uniform structural and electrical arrangements are employed so that, with standard lengths of tubing, adequate light output is obtainable in a given room, office or shop, taking into consideration the amount of light required, the general decorative scheme, and the amount of light absorption as from walls, furnishings, and the like. Uniform types of mounting plates are secured to the ceiling at definite uniform distances, depending upon the length of tubing employed, and, utilizing these mounting plates, the necessary transformers, tube supporting brackets, electrical connections, and decorative housings are attached readily and expeditiously by a single workman where necessary. Improved simplified means are utilized for carrying the tubes and providing the necessary electrical connections.

Other specific objects and features both as applied to the system generally and specific features of construction will be apparent from a consideration of the detailed description which follows, taken with the accompanying drawings, wherein—

The same features and concepts are employed throughout, including the same or a similar structure for mounting and supporting each unit wherever employed. Tubes are furnished in standard lengths, such for example as in six-foot lengths, and multiples of six feet can be provided to extend over any desired portion of a ceiling, but preferably over a sufficient portion of the ceiling to produce an even distribution of light in the entire room. In some installations, this might mean a single double row of tubing down the center of the ceiling extending twelve, eighteen or twenty-four feet, depending upon the dimensions of the room, or a double or triple line of tubing, depending upon the width of the room. An installation is readily planned, taking into consideration the light output per unit length of tubing, the amount of light desired, the size of the room, the height of the ceiling, the character of the light reflecting surfaces, and the like.

Simplified engineering charts may be furnished to an installer so that he may readily determine the number of standard tubes required and the preferred manner of distribution of those tubes in the room. A mounting plate is then secured to the ceiling at the location of each unit, and the individual units are readily and quickly secured to the mounting plate. The units secured to the mounting plates are alternately of the current supplying type or the tube connecting type and either may comprise an intermediate unit or end unit depending upon the number of tubes used and their distribution. The required light output per unit length of tubing may have to be taken into consideration and, should the installation be such as to require maximum light output per unit length of tubing, a combination current supplying unit and tube connecting unit may be employed, in which case such unit may be secured to the same mounting plate which would normally support either of the individual units referred to.

Figures 1, 2, 3:
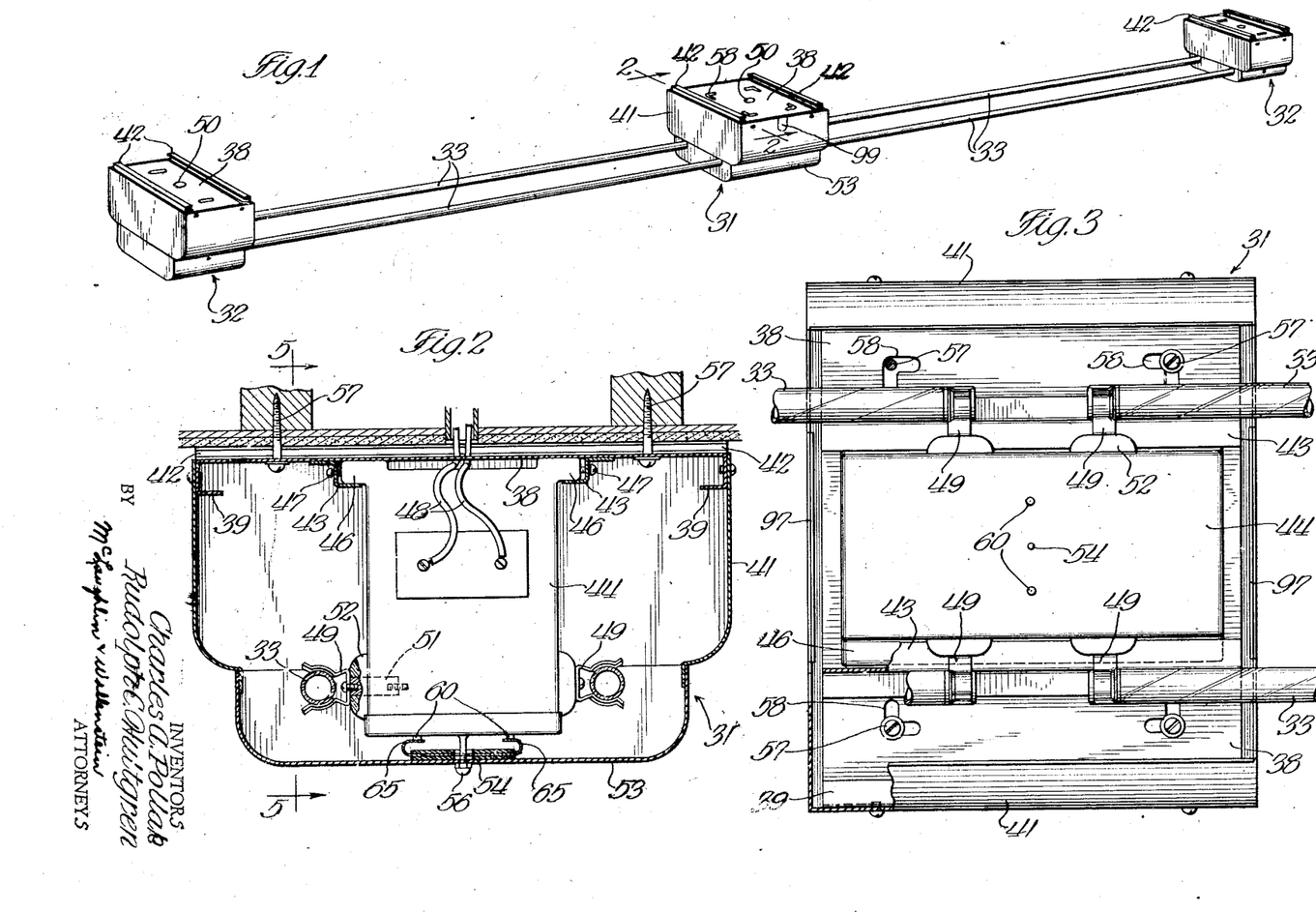
Fig. 1 is a perspective view of a simple form of assembly utilizing the features of the present invention, the view being taken as if the surface to which the assembly was attached is removed and the view was taken from above.
Fig. 2 is a vertical sectional view taken on the line 2—2 of Fig. 1, looking in the direction of the arrows, the section indicating one manner of connecting an intermediate current supplying unit to a ceiling.
Fig. 3 is a bottom plan view, the portion of the assembly shown in Fig. 2, with a cover plate removed and some of the parts broken away to more clearly show the relationship of the parts.

Referring now to the drawings, the installation of Fig. 1 employs an intermediate current supplying unit indicated generally by the reference character 31, and end tube connector units indicated generally by the reference character 32. Standard lengths of tubing 33 are supported in a double line between the three units there shown. The current supplying unit 31 carries a transformer, as will be explained, whereby to supply current of proper voltage and proper amperage to the tubes. The circuit is such that the two tubes running parallel to each other are included in the same circuit, and the transformer is therefore preferably of a type utilizing a single primary and two secondaries. The tube connecting units function to support the outer ends of the tubes and carry a jumper connection to establish the series relationship of the tubes just referred to. The general arrangement will be understood by reference to Fig. 24 in which the circuit employed is shown. The primary 34 of the transformer is supplied with commercial alternating current, and the transformer being suitably designed, a current is generated in the secondary windings 36. The two ends of each of the secondary windings are connected to the adjacent ends of tubes 33. The opposite ends of tubes are connected by a jumper 37 housed in the end tube connecting units. As will be clear from the following portions of the description, all of the high voltage connections are within the units on which the tubes are carried. Thus, secondary high tension wiring is avoided entirely and one of the principal problems encountered in the use of high voltage tubing for lighting purposes is eliminated.

Figure 5:
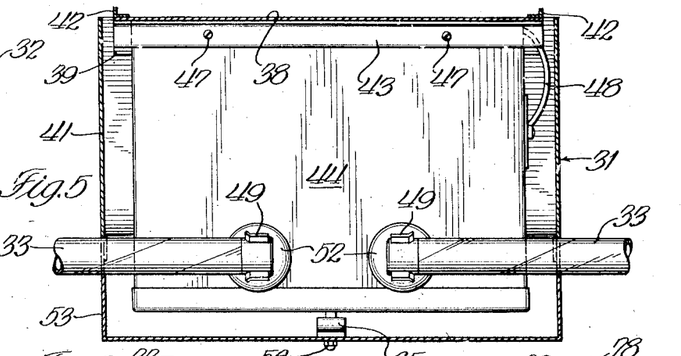
Fig. 5 is a vertical sectional view taken on the line 5—5 of Fig. 2 looking in the direction of the arrows.

The circuit supplying unit 31 and the mounting plate which carries it are shown more in detail in Figs. 2, 3 and 5. The mounting plate is in the form of a plate 38 such as a sheet metal plate of suitable gauge, the edges of which are formed, as shown at 39, to facilitate mounting a housing 41 and also to impart greater strength and rigidity to the mounting plate as a whole. On the upper side of the mounting plate are a pair of spacing rails 42, these rails also serving the function of imparting rigidity to the mounting plate in a plane opposite to that in which the formed edges 39 are effective. The spacing rails 42 are readily formed of separate pieces and secured to the upper face of the mounting plate by a spot welding operation. These spacing rails serve to leave an open space between the top of the mounting plate and the surface of the ceiling this space being of advantage both so far as mounting the plate is concerned and also for the dissipation of any heat which may be generated when the tubes are energized.

At the under side of the mounting plate 38, a pair of parallel rails 43 are provided, these rails, as shown in Fig. 2, being of general S-shape and so arranged that one leg of the S may be secured flat, such as by a welding operation, to the surface of the mounting plate, and the remaining two legs provide a pair of rails or channels for sliding attachment of a unit which is to be supported by the mounting plate. Where the current supplying unit is concerned, a transformer 44 has the upper portion of its case shaped to provide a pair of side extensions 46 which fit into the channels provided by the rails 43. Set screws 47 may be utilized to hold the transformer in place, although the set screws may be omitted if desired.

The transformer is entirely contained within its case, current being supplied to it through leads 48 extending through a center opening 50 in the mounting plate and projecting from a suitable outlet provided in the ceiling. Mounting clips 49 for the tubes are provided at each side of the transformer, each oppositely placed pair of clips being connected to opposite sides of one of the secondary windings of the transformer. The connections are made directly through the transformer casing. A suitable arrangement is shown wherein a short rod-like connector 51 extends through the center of an insulating boss 52, and a screw holding the clip in place is threaded into the end of the connector. The structure is indicated at the left of Fig. 2.

The housing 41 is preferably formed in two parts, as shown, a lower part 53 telescoping over the mutually engaging portion of the upper part of the housing. The lower portion of the housing is held in place by any suitable means, a convenient arrangement being to anchor a threaded mounting stem 54 to the center of the transformer casing, extend this through a suitably provided aperture in the housing portion 53, and attach a nut 56.

It will be noted that the mounting clips 49 have their edges flared outwardly to facilitate introduction of a tube from the side thereof. These clips, of course, are formed of spring material and engage a suitably provided cap on the end of the tube which is connected to the electrode in any suitable manner. At times, particularly in one embodiment shown herein, it may be advisable to slide the tube in endwise rather than engage it from the side, and it will be noted that one edge of the clip is flared outwardly (see Fig. 3) to facilitate engagement of the tube in this manner.

The mounting plate shown in Figs. 2, 3 and 5 may support a tube connecting unit in place of a current supplying unit. This mounting plate, moreover, may be secured in position in various ways depending upon the conditions encountered. In Fig. 2, the installation assumes the presence of a pair of joists above the plaster line into which screws 57 may be threaded for holding the mounting plate against the ceiling. The specific mounting means, however, may have to be modified in view of conditions. Where the plate is mounted over a portion of the ceiling where a joist is not located, a suitable method is to pierce the ceiling, introduce a toggle bolt and tighten it up to expand the toggle mechanism above the lath and plaster in a manner well understood by those acquainted with building structures. In cases where a ceiling may be of concrete, as occurs in some factory and shop buildings, a hole may be drilled in the concrete and a type of connector used wherein a tapered screw causes a lead insert to be expanded against the inside of the drilled hole. Another method of mounting may be utilized where the mounting plate is secured over an outlet wherein a conduit may project through the ceiling line and carry wires in a way frequently found. When such an installation is present, the outlet pipe may be extended through the opening 50 and a suitable collar threaded onto the portion of the outlet projecting through the mounting plate.

It will be noted that the mounting plate is provided with a plurality of angle slots 58. These facilitate positioning of the mounting plate on the ceiling, allowing considerable latitude in the location of mounting studs, screws and the like and also in the adjustment of the plate after its position has been approximately determined. Minor variations in the positioning of the plate, however, are taken care of in the tube connecting unit with which the current supplying unit cooperates.

To avoid the possibility of exposing the high tension clips to a person not fully cognizant of the dangerous character of high voltage, a safety feature is provided as shown in Fig. 2. A pair of terminals 60 connected into the low voltage side of the transformer circuit are bridged by a spring contact 65 when the bottom housing is placed in position. The bridging contact 65 is carried by an insulating support as shown, and the construction is such that the stem 54 is spaced from the bridging contact. When the housing 53 is removed, the circuit is broken. Other similar arrangements may, of course, be employed.

Figure 6:
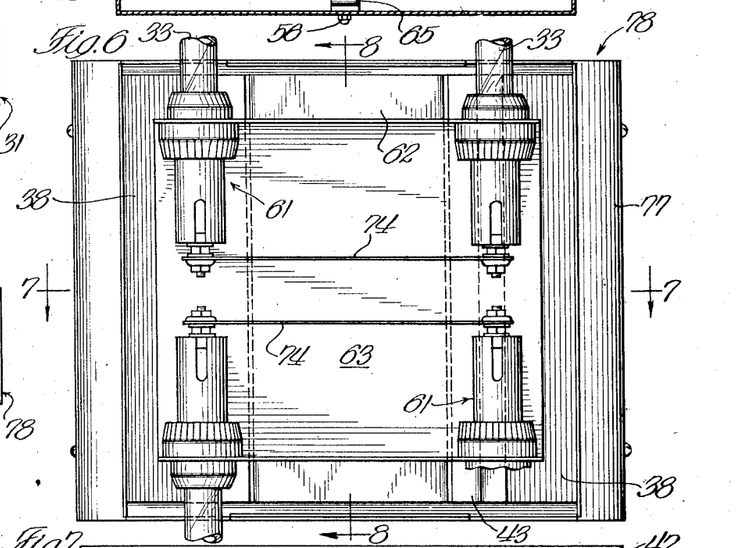
Fig. 6 is a bottom plan view of an intermediate tube connecting unit, the cover plate being removed to show tube sockets and jumper connections between the pairs of tube sockets.
Figure 7:
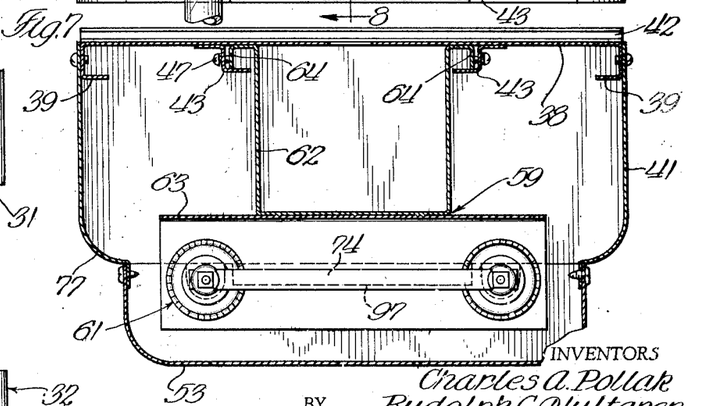
Fig. 7 is a sectional view taken on the line 7—7 of Fig. 6, looking in the direction of the arrows.
Figure 8:
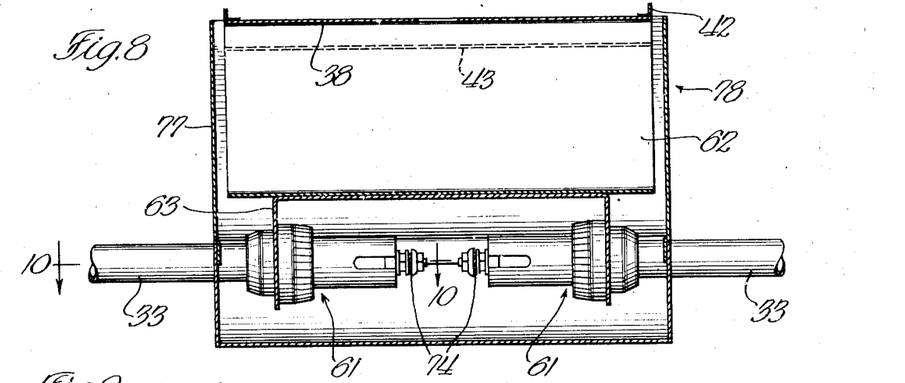
Fig. 8 is a longitudinal vertical sectional view taken on the line 8—8 of Fig. 7 showing the tube connecting sockets in elevation.
Figure 10:
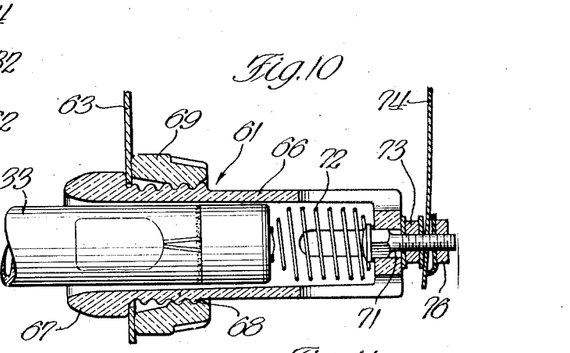
Fig. 10 is an enlarged sectional view taken on the line 10—10 of Fig. 8.

A tube connecting unit is shown in detail in Figs. 6 to 8, inclusive. The unit comprises a frame structure 59 carrying a plurality of tube sockets 61 (see Fig. 10) formed to be readily mounted by a sliding operation onto the rails 43 of the mounting plate. In the form shown in the drawings, the frame comprises a pair of formed sheet metal members 62 and 63 secured together as by a welding operation where they come in contact. The member 62 has a pair of parallel edges formed over to produce flanges 64 which engage above the rails 43. The member 63 has two edges running at right angles to the flange portion 64 formed over at right angles to provide supports for the tube sockets (see Fig. 8).

Each tube socket comprises a generally tubular member 66 having a relatively narrowed portion extending through an aperture provided in the member 63, and an enlarged portion 67 adjacent the threaded portion 68. A threaded collar 69 engages the threaded portion of the socket so that the enlarged portion 67 and collar 69 engage opposite sides of the opening in the member 63 to form a firm but insulated support. The tube 66 and collar 69 may be formed of any suitable insulating material such as porcelain, glass or the like. Extending through the apertured end of the tube 66 is a metal bolt 71, under the head of which one end of a coil spring 72 is engaged. By tightening a nut 73 against the outer end surface of the tube 66, the spring 72 is held in position and centered and at the same time maintained electrically in engagement with the screw 71. From a consideration of the circuit shown in Fig. 24, it will be recalled that the end electrodes of the two related tubes 33 are to be interconnected. The tube connector assembly provides for this by means of a jumper 74 preferably in the form of a flat strip of copper. This strip is apertured to pass the bolt 71 and is held in position by a second nut 76, as shown clearly in Fig. 10. In the structure resulting, each coil spring 72 is electrically connected to the associated bolt 71 and to a jumper 74. This jumper then extends transversely to a related tube socket as shown in Fig. 6 whereby to establish the electrical connection illustrated generally in Fig. 24.

The tube connecting unit is provided with a housing 77 such as shown in section in Fig. 7, and this housing may be two-part as shown in the drawings or it may comprise a single unit housing depending upon the design and method of fabrication. The housing 77 is preferably identical in outward appearance with the housing for the current supplying unit.

Figure 9:
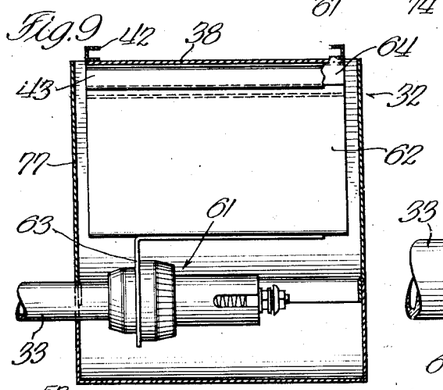
Fig. 9 is a section similar to Fig. 8 but illustrating the construction where the tube connecting unit is of the type used at the end of a line of tubes.

In the form of installation shown in Fig. 1, the tube connecting units 32 are indicated as being somewhat smaller than the current supplying unit 31. Preferably, a unit at the end of the line such as in the installation of Fig. 1 is of smaller size although it may be of identical size if desired. On an end unit, however, it is necessary to supply only two tube sockets, although in substantially all other respects, the structure may be identical with that shown in Figs. 6 to 8, inclusive. In Fig. 9, the member 63 is shown with only a single angle portion to which only a pair of tube sockets 61 are secured. For convenience, the same reference characters employed in Figs. 6 to 8, inclusive, are applied to Fig. 9 to identify similar or identical parts.

The mounting plate shown in Fig. 9, and to which the units 32 are secured in Fig. 1 is shown as being somewhat smaller in the direction running longitudinally of the tubes than the mounting plate supporting the intermediate current supplying unit 31. It will be understood that these plates may be identical, but even when one is made somewhat smaller than the other, the cross sections are identical and the same forming tools may be employed to produce both plates. This is clear from a consideration of the cross section of the mounting plate shown in Figs. 1, 2 and 7.

The formed portions 39 are identical and the same forming tool may be used whether an operation is being carried out on a relatively wide or relatively narrow sheet. The rails 43 are identical except for the length and they may obviously be produced by the same tool. The spacing rails 42 are identical as will be apparent by examining Fig. 1. The opening 50 is the same and the slots 58 may either be identical or a —variation may be used as shown in connection with the end units 32 of Fig. 1. So far as the slots are concerned, they are produced by an ordinary punching operation with relatively inexpensive dies so that the utilization of more than one type of slot does not affect the essential identity of the mounting plates.

Figure 4:
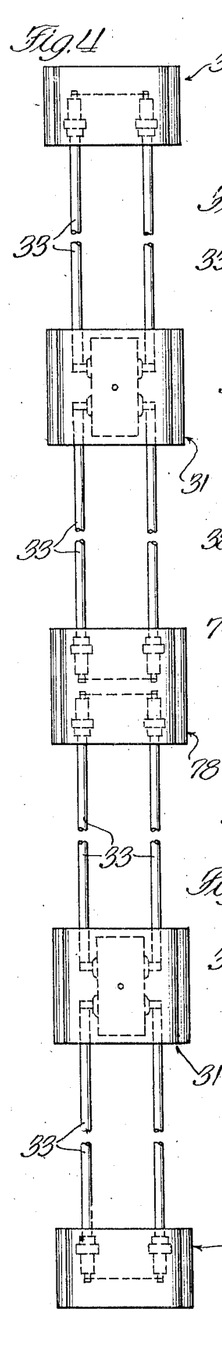
Fig. 4 is a general view looking upwardly at an installation, the tubes being broken off to conserve space and some of the parts being shown in dotted lines to facilitate an understanding of the general arrangement.
Figure 15:
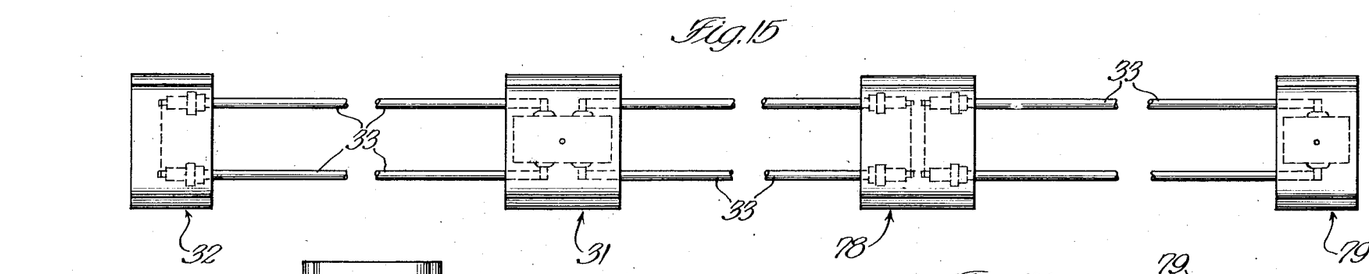
Fig. 15 shows a type of installation wherein a current supplying unit may be placed at the end of a line of tubes.

When a relatively longer line of tubes is to be used than shown in Fig. 1, it becomes necessary to employ an intermediate tube connecting unit 78 as shown in Fig. 4, while the end units 32 and intermediate current supply units 31 may be of the type described in connection with Fig. 1. In this form of installation, all of the current supply units are of the intermediate type so that, assuming six-foot tubes, the total length of tubing in the installation will be a multiple of twelve, figuring each intermediate current supply unit as supplying a pair of six-foot tubes on each side thereof. In the form of installation shown in Fig. 15, however, an end current supply unit 79 is employed. This form of installation may be considered as identical with the installation of Fig. 1, for example, but with an extension from the right hand side made by substituting the unit 32 with a unit 78 and then adding an end current supply unit 79. The installation of Fig. 15, therefore, may be eighteen feet or any multiple of twelve feet plus an additional six feet, such, for example, as 30 feet.

Figures 16, 18:
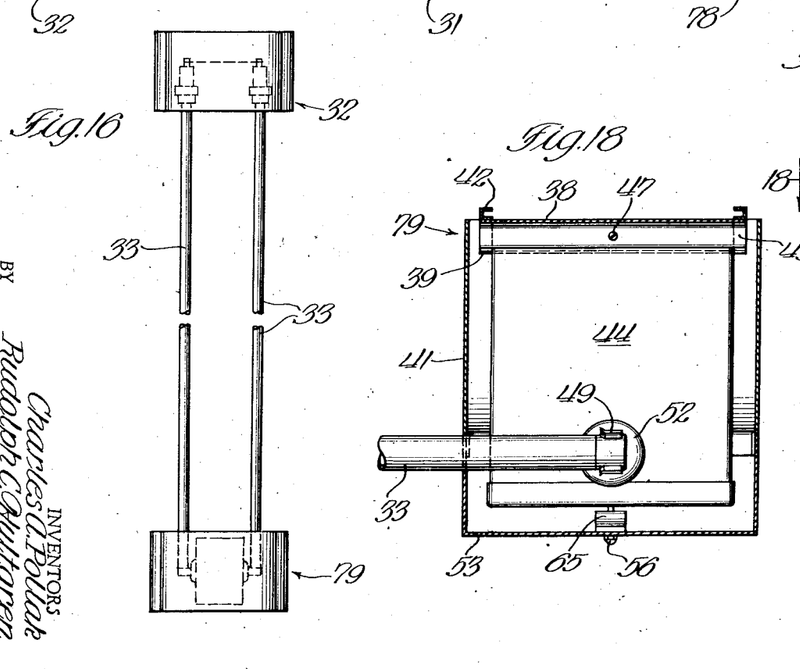
Fig. 16 shows another form of installation, wherein only end fixtures are employed with no intermediate unit either of a current supplying type or tube connecting type.
Fig. 18 is a sectional view taken on the line 18—18 of Fig. 17 looking in the direction of the arrows.

When only a relatively small amount of light is desired, such as may be obtained with a double length of six-foot tubing, an installation such as shown in Fig. 16 may be provided. This installation makes use of an end tube connecting unit 32 and an end current supply unit 79. As in the other forms of installation, uniform mounting means and identical or uniform fixtures may be employed throughout. For example, the mounting plates used in the installations of Figs. 4, 15 and 16 (as well as in other forms of installation which will be described) are the same as shown and described in connection with Fig. 1.

Figure 17:
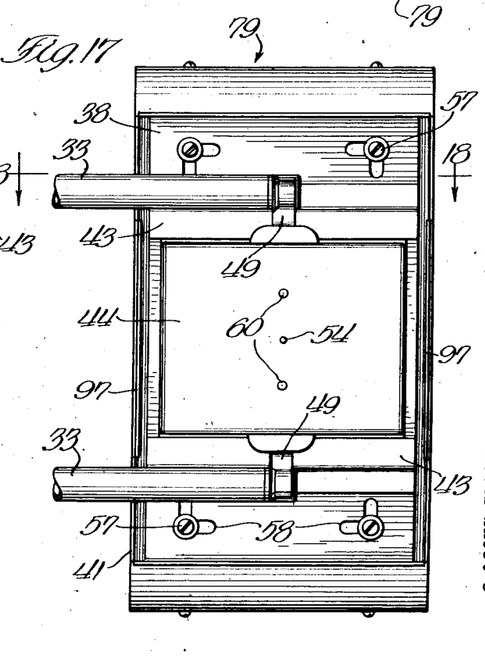
Fig. 17 is a bottom plan view illustrating the use of the uniform structure when the current supplying unit is of a type employed at the end of a line of tubes.

So far as the construction of the units is concerned, the unit 78 is identical with the unit 32 except for the provision of two pairs of tube sockets in place of a single pair. The unit shown in Figs. 6 to 9, inclusive, is of the intermediate type such as shown generally at 78 in Fig. 4. The structural differences between this unit and the unit 32, as well as the similarities, have been pointed out. Substantially the same general type of similarity discussed in connection with the units 78 and 32 is present when the units 31 and 79 are compared. It will be seen that the end current supply unit 79 shown in the bottom plan in Fig. 17 is the same transformer mounting, the same general transformer structure, the same clip structure, and the like, as shown in Figs. 2 and 3. The section shown in Fig. 18 further brings out the similarity. For convenience, the same reference characters are utilized to identify structurally identical or functionally identical parts. The sole significant difference from the standpoint of function is in the circuit in that the transformer may be of smaller capacity and provided with only a single secondary in place of two secondaries. Since those skilled in the art readily understand transformer designs so far as current output is concerned, it is deemed unessential to detail the transformer circuit.

Figures 12, 13:
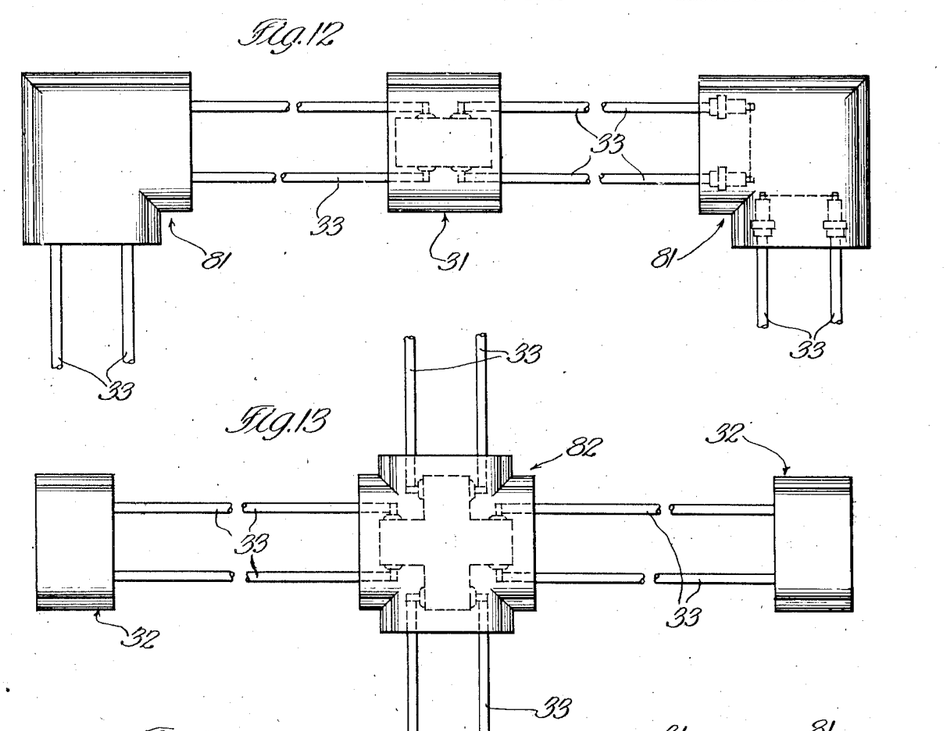
Fig. 12 is a bottom plan view showing a portion of a modified type of installation.
Fig. 13 shows a still further modification.
Figure 14:
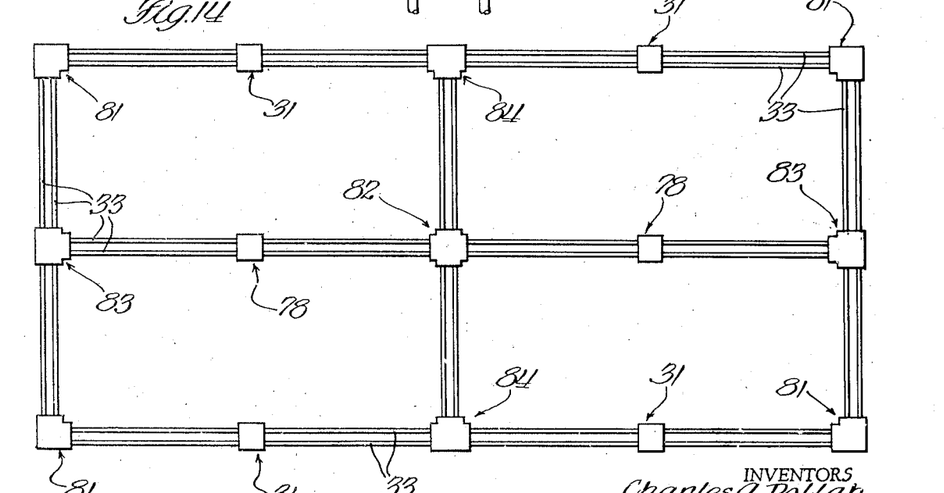
Fig. 14 shows the manner in which a plurality of lines of tubes may be employed with cross connecting tubes defining a complete structure of a generally parallelogram type.

It is not essential that the tubes be arranged only in a single line, or plurality of single lines arranged parallel, but, as shown in connection with Figs. 12 to 14, inclusive, other designs such as L's, U's, T's, crosses, squares, parallelograms, and the like may be employed, the purpose being to produce such a pattern at the ceiling that the light is distributed uniformly throughout the entire space which is to be lighted.

Looking at Fig. 12, it will be seen that an intermediate current supply unit 31 is provided with corner tube connecting units 81 similar in function and generally similar in the arrangement and structure of parts as the intermediate tube connecting unit 78 previously described. The significant difference is that the two pairs of tube sockets 61 are placed at right angles to each other in place of back to back, as indicated at the right of the drawings, and obviously the member 63, comprising a part of the support, must be suitably formed to make this positioning possible. It will be noted that the spacing of the parts, the housing arrangement, the mounting plate and other features may be substantially the same as in the forms previously described with the exception of such modifications as may be required, for example, in the shape of the housing, to carry out the corner motif from a design standpoint. It will be understood that, in the form shown in Fig. 12, there is an additional current supply unit for each of the tubes 33 shown broken off, and this may be an intermediate unit or an end unit depending upon the extent to which the line of tubes starting at the corner units 81 are extended.

In Fig. 13, a cross design is shown wherein an intermediate current supply unit 82 is provided of a type supplying power to four sets of tubes rather than to two sets as in previously described intermediate current supply units. The general arrangement is indicated by the dotted transformer outline which, however, need not be described in complete detail. It is sufficient to point out that the tube supporting clips, mounting plate and support for the transformer on the mounting plate may be the same as in previously described arrangements. End tube connecting units 32 are shown with tubes running vertically from the current supply unit 82 to tube support units such as units 32 or units 78 depending upon the length to which the line of tubes is extended. From the showing of previously described arrangements, the manner in which these tubes may be connected into a suitable line of tubes should be clear.

Fig. 14 shows another arrangement illustrating the versatility of the system. In this form, the entire ceiling of a room such as a factory building may be blocked out with lines of tubing whereby to obtain very even distribution and a high value of illumination. In accordance with this form, all of the units are of the intermediate type, that is to say, all of them have at least two sets of tubes connected to them. While the arrangement may vary, the center unit may be of the intermediate transformer type 82 described in connection with Fig. 13. Two intermediate tube connecting units 78 are utilized and four intermediate current supply units 31. The outside corners are occupied by tube connector units 81 such as described in connection with Fig. 12. In addition, there are two intermediate transformer units 83 which may be structurally substantially identical with transformer units shown in detail in other figures, but having three sets of tube connecting clips, and a transformer arrangement wherein current is separately supplied to three pairs of tubes. Those skilled in the art will understand that various electrical arrangements may be employed, such for example as the use of two primaries, one having two secondaries and the other with only one secondary winding, and it is believed unnecessary therefore to show a wiring diagram. There are also two intermediate tube connecting units 84 having three sets of tube sockets to provide for a return lead to each pair of tubes leading to these units.

While it is deemed unnecessary to show in detail the structural features utilized in the units 83 and 84, those skilled in the art will readily understand that the features discussed hereinabove with respect to the units shown in detail may be used as well with these generally illustrated units. The mounting units with the rails 43 and sliding connection between these rails and either the transformer casing on the one hand or the tube socket carrying frame on the other hand may be identical. Clips on the transformer casings, the manner in which electrical connections are made to the clips, the construction and disposition of the tube sockets and the use of the jumper 74 may also be identical with the structure detailed hereinabove.

Figure 22:
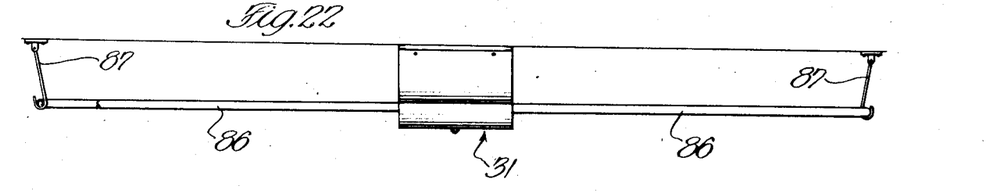
Fig. 22 is a side elevational view, with one tube partially broken away, of a modified construction wherein the current supplying unit is employed but with a U-tube in place of parallel tubes with end tube connecting units as shown in preceding embodiments.
Figure 23:
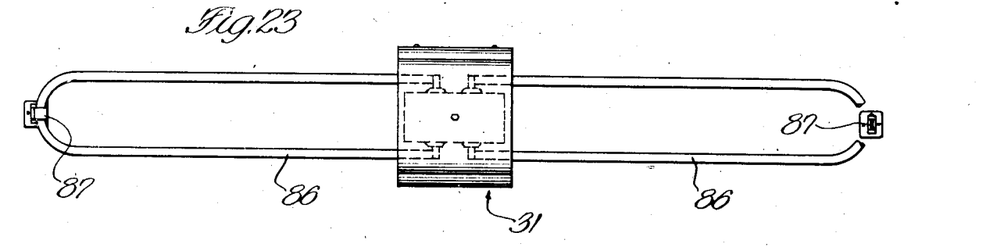
Fig. 23 is a bottom plan view of the installation shown in Fig. 22.

It is not essential that end tube connecting units 32 be employed, as will be clear from a consideration of the installation shown in Figs. 22 and 23. Here U-tubes 86 are provided with terminals at contiguous ends supported on the usual clips carried by an intermediate current supply unit 31. Thus, the electrical connections to the tube are entirely within the transformer unit and no connection whatsoever need be made at the end of the tube removed from the unit 31. Any suitable means may be provided for supporting the rounded end of the tube such as a hook 87 mounted on the ceiling. This hook may be of suitable insulating material having a pleasing appearance such, for example, as a translucent plastic material, although it may be metal or similar material, if desired. A U-tube 86 may also be employed at the end of a line of tubes such as shown in Fig. 4, when the arrangement is such that current supply in the end unit is not required.

Figure 19:
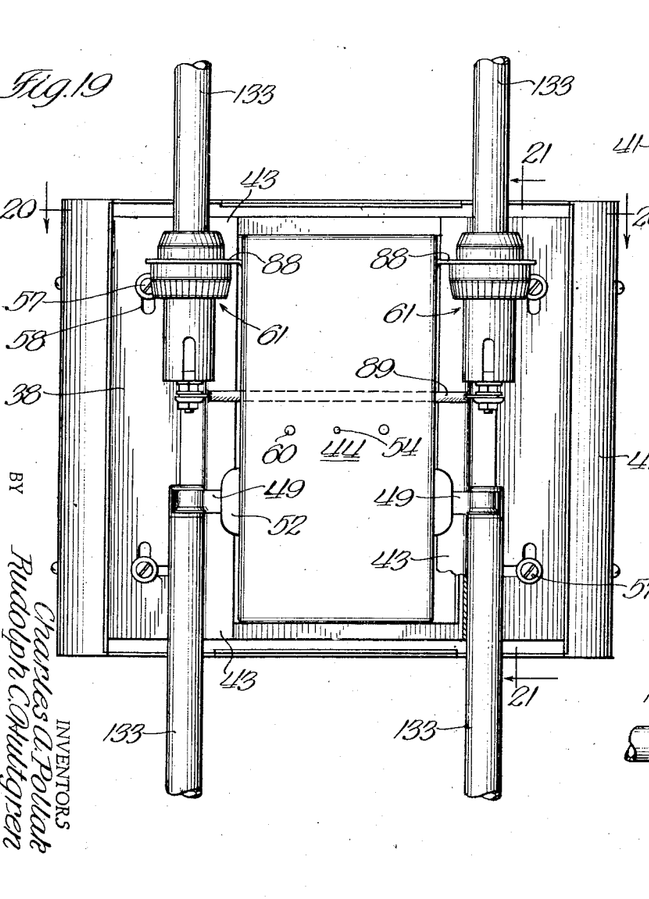
Fig. 19 is a bottom plan view showing a unit wherein the current supplying structure and tube connecting structure comprise part of the same unit, the unit being such as employed when current is supplied at each fixture.
Figure 20:
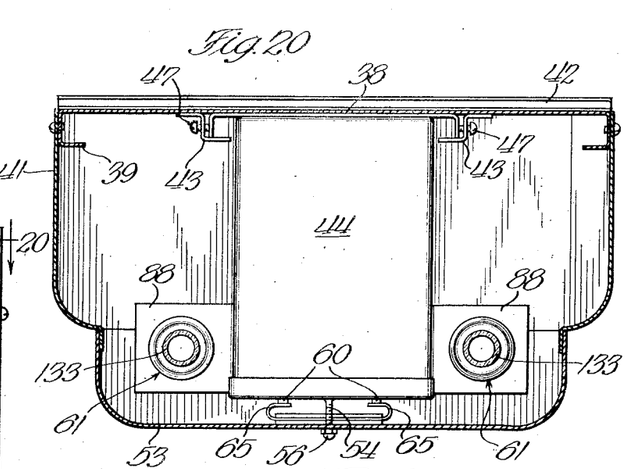
Fig. 20 is a sectional view taken on the line 20—20 of Fig. 19.
Figure 21:
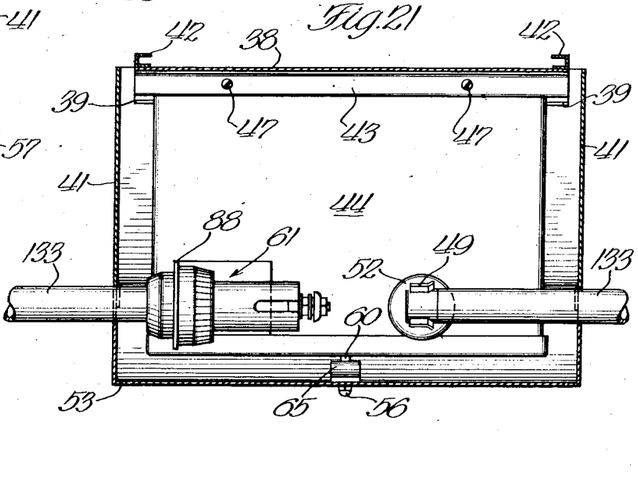
Fig. 21 is a sectional view taken on the line 21—21 of Fig. 19.

At times it may be desirable to utilize a separate transformer for each single pair of tubes. This will mean that in every unit except one a transformer is required. Features of the invention may be utilized by the provision of a combination tube supply and tube connecting unit such as shown in Figs. 19 to 21, inclusive. In this form, the identical mounting plate is used such as described in connection with Figs. 2 and 3, the identical transformer case, the identical manner of support, and the identical form of housing. In place of two pairs of clips, only one pair of clips 49 is used. A pair of tube socket supporting brackets 88 are carried by the transformer casing, and may, if desired, be a portion of the metal of the casing formed over at right angles as shown particularly in Figs. 19 and 21 of the drawings. Tube sockets 61 are supported on the brackets 88 in the identical manner that the identical tube sockets are carried by the member 63, as shown in Figs. 6 to 9, inclusive. In all respects, these tube sockets may be identical with the tube sockets previously described. The only change in the entire construction is in the use of an insulating cable 89 to form a connection between the contact portions of the tube sockets. As indicated in Fig. 19, this cable may run directly through the transformer casing, or, if desired, any suitable modified arrangement may be employed to make the cross connection. From the standpoint of structure, it will be noted that each unit has a pair of clips 49 connected to the terminals of tubes 133, these clips being connected with the secondary winding of a transformer to supply current to the tubes. The same unit also carries one pair of tube sockets 61. If one interested in the use of this form of the invention will visualize a unit like the unit shown in Fig. 19 above and below the unit there shown, it will be clear that at each unit power is delivered to one pair of tubes and a connection is made between another pair of tubes supported in the same unit.

Figure 24:
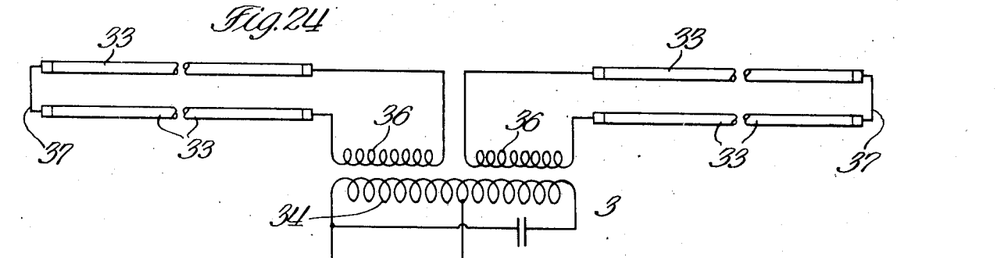
Fig. 24 illustrates a circuit which may be employed with the intermediate current supplying unit such as utilized in the forms of installation illustrated in Figs. 1 and 4.
Figure 26:
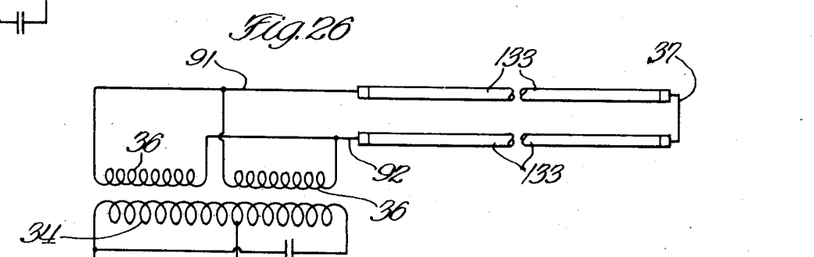
Fig. 26 illustrates a circuit which may be employed when a combination current supplying unit and tube connecting unit is employed, such as illustrated in Figs. 19 to 21, inclusive.

The construction of the transformer and circuit employed when a unit of the type shown in Figs. 19 to 21 is used may vary. Preferably, however, a transformer substantially identical with the transformer employed in the unit 31 is provided with, however, a circuit such as shown in Fig. 26. Here a primary winding 34 has secondary windings 36. These two secondaries are connected in parallel to conductors 91 and 92 leading to tubes 133. It will be understood that the connections 91 and 92 shown in Fig. 26 would in fact be connections to the clips 49, and the connection 37 shown at the end would correspond to the connection by way of the jumper cable 89 (Fig. 19). The function of the circuit is that the entire output of the transformer is delivered to two tubes rather than four tubes, and the amount of light emitted by the two tubes is approximately double the amount of light emitted from two tubes when the circuit of Fig. 24 is used, assuming, of course, all other factors to be the same. For example, if tubes 18 mm. in diameter and 6 feet in length are used, we may assume that 3000 volts are supplied to the tubes 33 at 60 milli-amperes. In the circuit shown in Fig. 26, 3000 volts would be supplied to the tubes 133, but at approximately 120 milli-amperes. While the light output of the tubes is not exactly proportional to the power input, for all practical purposes it may be said that the light output of a tube 133 connected in the circuit as shown will be double the light output of a tube 33 connected in a circuit such as in Fig. 24. It will be understood that the same general results may be obtained with a different wiring arrangement in the transformer.

The advantage of the use of combination units such as shown in Figs. 19 to 21, inclusive, and the use of a circuit such as shown in Fig. 26 makes it possible to greatly increase the light output of the tubes without increasing the size of the transformer. Thus, the mounting plates, housings, and transformers, so far as their structural arrangement is concerned, may be kept identical with those employed in embodiments where intermediate tube connecting units 78 are used, and the same balance in design and structure is maintained throughout. Thus, one part of a large room may be provided with approximately double the amount of light provided at another part of the same room, but the layout, shape, arrangement and spacing of fixtures and tubes may be identical throughout the entire room. The arrangement, in general, therefore, is the same as if incandescent lamps of high wattage are placed in one part of a room and lamps of relatively low wattage are placed in another part of a room, but each employing a standard fixture.

Figure 25:
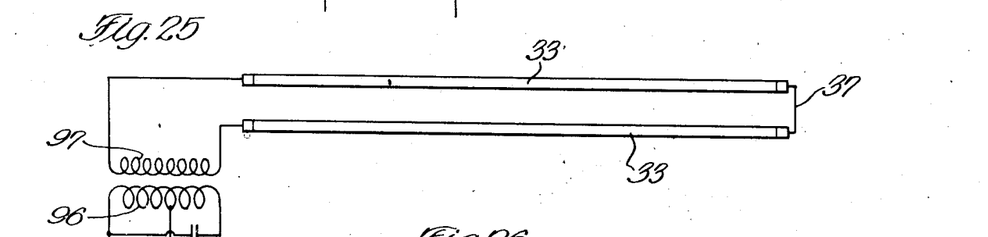
Fig. 25 illustrates a circuit which may be employed in a current supplying unit of a type utilized at the end of a line of tubes.

When the arrangement shown in Fig. 16 is used, a standard type of transformer may be incorporated in the end current supply unit 79. In general, however, it is preferable to employ a somewhat smaller transformer, that is, one having a single winding affording the same output as one of the secondary windings of the type of transformer previously described. It may be kept in mind, however, that even with only one pair of tubes such as shown in Fig. 16, it may be desirable to have approximately the light output normally obtained when a circuit such as shown in Fig. 26 is used with the unit shown in Figs. 19 to 21, inclusive. Assuming, however, that only that amount of light is required which will be produced by employing about 3000 volts at about 60 milli-amperes, a circuit arrangement such as shown in Fig. 25 may be employed. Here a transformer is provided having a primary winding 96 and single secondary winding 97. The single winding is connected to the adjacent terminals of the two tubes 33 and the opposite ends of the two tubes are interconnected by the conductor 37, as shown.

It will be noted, by reference to Fig. 1, that the tubes 33 pass through the lower housing member 53 at an edge opening in this portion of the housing where it connects with the upper housing portion 41. If Fig. 11 will be consulted, it will be seen that there is a lower edge recess 97 in the housing member 41 and a corresponding edge recess 98 in the housing member 53. Normally, the recess 98 is not open, but knock-out sections 99 are provided such as shown at the left hand unit 32 of Fig. 1. These knock-out sections, suitably placed, are provided at each portion of the housing member where it may be desired to pass tubes or wires. Thus, a similar knock-out is shown at the side of the member 53 forming a part of the unit 31 in Fig. 1. Because of the finish employed on the housing members, these knock-outs are not visible when the units are mounted on the ceiling.

In connection with the knock-outs, it may be noted that commercial electric lines may be brought into the housing through one of these knock-outs if it is not convenient to mount a transformer unit directly over an outlet. So called "wire mold" may be used for the purpose if desired.

Figure 11:
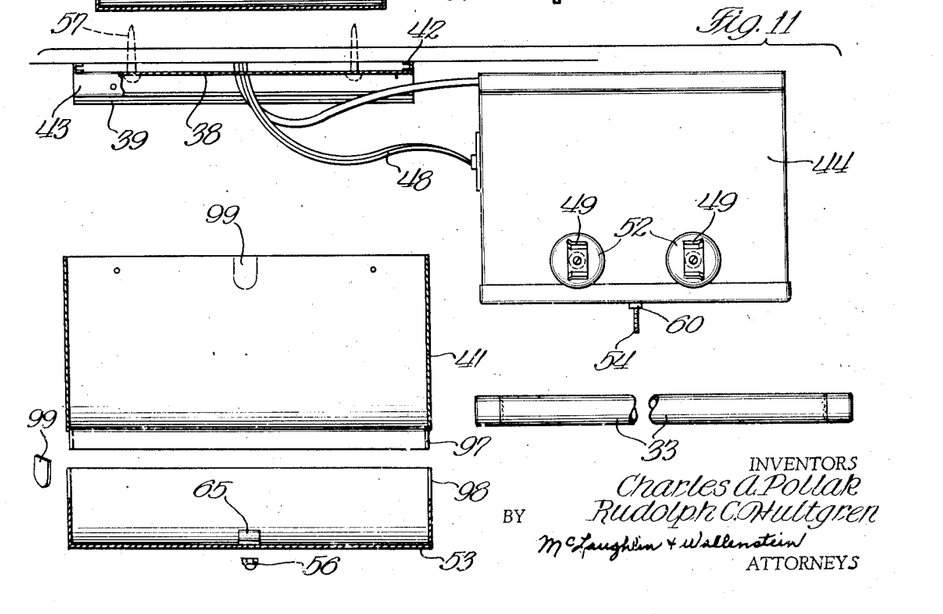
Fig. 11 is an exploded view partly in section and with some parts broken away to improve the showing and conserve space, this exploded view indicating the main structural parts of the current supplying unit with the housing therefor and showing how the parts are assembled.

It is believed that the features, advantages and manner of use of the system of the present invention are in general clear from the above description. The contractor or installer required to make a lighting installation employing the system of the present invention with its novel features determines from the size of the room, the nature of the reflecting surfaces, and the character of activity going on in the room, the total amount of light which will be required. Figuring a tube with a given output of light per unit length, he determines the number of feet of tubing required and the number of individual lengths of a standard tubing. The position of the tubing may then be laid out to obtain the most uniform distribution of light, or to concentrate the illumination at certain areas, as appears most desirable. From this layout, the position of the various units on the ceiling is determined and mounting plates are provided at these positions. The standard wiring outlet being provided at the position of the mounting plates where current supply units are to be mounted, the transformer units are connected as shown in Fig. 11 and the transformers are slid into position on the rails 43. Connections to the primary leads of the transformer may be made either before or after the transformer is mounted in position, the latter generally being preferred because it affords a firm support for the transformer during the time that the necessary low voltage connections are made to the transformer. The transformers are then anchored in position by suitable means such as the screws 47 shown in Fig. 2. The upper portion 41 of the housing may then be mounted in position. The installer then mounts the tube connecting unit in the same manner on the rails 43 and secures the housings in position. The arrangement is such that a single man may perform all of these operations. The tubes are then placed in position by inserting one end into the tube socket and forcing it up against the spring 72, the other end then being brought into position and snapped into engagement by the proper clip 49. The proper knock-outs 99 having been removed, and a check having shown that the installation is properly made and that the tubes light when current is supplied to the transformers, the lower sections of the housing are secured in position and the installation has been completed. All of these operations including the insertion of the tubes, even though the length may be six feet or more, may be carried out by a single workman.

The arrangement for mounting the tubes not only makes it possible for a single workman to make the installation and to change tubes when a change is required, but minor errors in the positioning of the units are compensated for due to the action of the spring 72. Adjustments may also be made to some extent by readjusting the position of the transformer on the rails or by adjusting the position of the mounting plate on the ceiling. Where it is desirable, the tube 33 may be inserted in the clips 49 by an endwise movement rather than a sidewise movement, by forcing the tube entirely within the socket so as to entirely compress the spring 72 and then moving it in an endwise direction to engage its opposite end at the clip 49. In connection with the mounting of the tubes, it will be noted that there is adequate play between the tube and the inside of the socket 61 to permit some angulation of the tube, but with the dimensions maintained close enough so that a definite support and positioning for the tube is assured. It will be noted, moreover, that in the form of the invention shown in Figs. 22 and 23, there is definite advantage in permitting the tubes to be inserted in their supporting clips by an endwise movement rather than by inserting them from the side.

Whatever the type of installation may be, the same general principles for installing the system may be followed. The system is intended primarily for stores, offices, assembly halls and other more or less public rooms, but its factor of safety is so high that however used and wherever mounted, there is very slight possibility of injury due to the presence of relatively high voltage. It will be noted that the construction is such that more than adequate clearances are maintained between all current carrying parts, and there is no secondary high tension wiring, all high tension leads and connections being within a housing which, when installed, is readily grounded. The feature of breaking the circuit when the lower housing section is removed further assures adequate safety. When this feature is employed, it will be understood that when an installation is made, and for the purpose of testing the installation before mounting the housing in position, a bridging contact or jumper may be readily inserted by the workman for the purpose of establishing the circuit which is interrupted by the removal of the lower housing member.

What we claim as new and desire to protect by Letters Patent of the United States is:

1. In a lighting system employing high voltage luminescent tubes mounted on or near a ceiling, a mounting plate attachable to the ceiling, a transformer having a primary winding and a plurality of secondary windings, means on the transformer and mounting plate providing readily engageable but readily releasable engagement between the transformer and mounting plate, a pair of tube supporting clips carried by the transformer for each secondary transformer winding, terminals of said secondary windings being connected to said clips, and a housing entirely surrounding said transformer and clips, said housing being apertured to pass luminescent tubes whereby all high tension leads and connections are within the housing.

2. In a lighting system employing high voltage luminescent tubes mounted on or near a ceiling, a mounting plate attachable to the ceiling, said mounting plate provided with a pair of top rails whereby to space the plate from the ceiling, a pair of rails on the mounting plate defining a pair of oppositely disposed channels, a transformer having a casing shaped to engage in such channels by a sliding action, said transformer having a primary winding and at least one secondary winding, tube mounting clips carried by the transformer casing, one secured to each terminal of each secondary winding, tubes having terminal contacts secured by the clips whereby to supply secondary voltage to the tubes, a housing enclosing the transformer and said clips, said tubes projecting from said housing, and additional means for completing a circuit including said secondary transformer winding, a pair of clips, and at least one tube, said means providing for entirely enclosing the circuit completing means employed, whereby a major proportion of said tubes are disposed outside of said housing, and all high tension leads and connections are within the housing.

3. In a lighting system employing high voltage luminescent tubes mounted on or near a ceiling, a mounting plate attachable to the ceiling, said mounting plate provided with a pair of top rails whereby to space the plate from the ceiling, a pair of rails on the mounting plate defining a pair of oppositely disposed channels, a transformer having a casing shaped to engage in such channels by a sliding action, said transformer having a primary winding and at least one secondary winding, tube mounting clips carried by the transformer casing, one secured to each terminal of each secondary winding, tubes having terminal contacts secured by the clips whereby to supply secondary voltage to the tubes, a light opaque housing enclosing the transformer and said clips, whereby all high tension leads and connections are within said housing, the transformer and mounting plate in one direction having smaller dimensions than the housing, whereby to place in communication the space within the housing and that space between the mounting plate and ceiling resulting from the presence of said spacing rails, said tubes projecting from the housing, whereby only that portion projecting from the housing is effective for lighting purposes and whereby all high tension leads and connections are within the housing, and means exterior of said housing for connecting projecting end terminals of said tubes whereby to connect said tubes in the same series circuit.

4. In a lighting system employing high voltage luminescent tubes mounted on or near a ceiling, a plurality of mounting plates disposed at uniform distances, each having a pair of rails together defining a pair of oppositely disposed channels, a current supply unit comprising a transformer having a casing with a pair of projections engaging in the channels of one of said mounting plates, said transformer having a primary winding and at least one secondary winding, luminescent tubes having terminal contacts, tube supporting clips carried by the transformer and electrically connected to a secondary winding thereof, a tube connecting unit comprising a frame having projections engaging the channels of a contiguous mounting plate, at least one pair of tube supporting members forming an electrical engagement with terminal tube contacts, each pair of tube supporting members having a jumper connection so that a circuit is established with the tubes in position, said circuit including a secondary transformer winding, two tubes and the jumper connection in series, and matching housings enclosing the current supply and tube connecting units, whereby all high tension leads and connections are within said housings.

5. A system as defined in claim 4, wherein said tube supporting members comprise sockets of insulating material, each containing a terminal contact engaging spring, whereby a single workman may mount a relatively long tube by engaging one end thereof against said spring, and clipping the other end to one of said clips, and whereby inequalities in spacing are compensated for by the presence of said spring.

6. A system as defined in claim 4, wherein said tube supporting members comprise sockets of insulating material, each containing a terminal contact engaging spring, a headed bolt extending axially of the socket and engaging an end coil of the spring to hold the spring axially of the tube, said jumper comprising a conducting strip secured to projecting ends of adjacent bolts.

7. A system as defined by claim 4, including means for breaking the circuit including the primary of the transformer as an incident to the removal of a housing.

8. A system as defined in claim 4, wherein a relatively large number of units is provided, a current supply unit and tube connecting unit being provided for each pair of tubes, intermediate current supply units having at least two pairs of transformer connected tube clips, a pair for each pair of tubes, and each intermediate tube connecting unit has at least two electrically interconnected tube supporting members, end units carrying only one pair of tube clips or tube supporting members respectively, depending upon the type of end unit provided for in the system.

9. A system as defined in claim 4, wherein a relatively large number of units is provided, a current supply unit and tube connecting unit being provided for each pair of tubes, intermediate current supply units having at least two pairs of transformer connected tube clips, a pair for each pair of tubes, and each intermediate tube connecting unit has at least two electrically interconnected tube supporting members, end units carrying only one pair of tube clips or tube supporting members respectively, depending upon the type of end unit provided for in the system, and matching housings for the units, the housing being so constructed and arranged that all high tension leads and connections are within the said housings.

10. In a system of the character described, a pair of mounting plates attachable to a ceiling, each mounting plate having a pair of rails defining oppositely disposed channels, a current supply unit having projections engageable in the channels of one of said mounting plates as a support, and a tube connecting unit having projections engageable in the channels of the other of said mounting plates as a support, a pair of luminescent tubes having end terminal contacts, means carried by the tube connecting unit for supporting the ends of said two tubes when in parallel relation, and forming an electrical engagement between them, said current supply unit including a pair of clips for supporting said tubes and electrically engaging the terminal contacts thereof, and transformer means including a primary winding and a secondary winding, the terminals of which are secured to said clips whereby to form a circuit including the two tubes and said secondary, matching housing means secured to the mounting plates and separately including both the current supply unit and tube connector unit, and means for delivering low voltage current to the primary of the transformer within the housing.

11. In a system of the character described, a plurality of mounting plates attachable at uniform distances to a ceiling, at least one current supply unit attached to a mounting plate, said unit having a transformer with primary and secondary windings, at least one tube connecting unit attached to a mounting plate, said tube connecting unit being so constructed and arranged as to support and interconnect at least one pair of tubes, a pair of tubes with terminal contacts disposed in parallel relation, means for supporting said tubes on the current supply unit to establish a series circuit including the secondary of the transformer, said tubes and tube connecting unit, and housing means enclosing the current supply and tube connecting units whereby all high tension leads and connections are enclosed by said housing means.

12. In a system of the character described, a plurality of mounting plates attachable at uniform distances to a ceiling, at least one current supply unit attached to a mounting plate, said unit having a transformer with primary and secondary windings, at least one tube connecting unit constructed and arranged to support and interconnect at least one pair of tubes, a pair of tubes with terminal contacts disposed in parallel relation, means for supporting said tubes on the current supply unit to establish a series circuit including the secondary of the transformer, said tubes and tube connecting unit, and housing means enclosing the current supply and tube connecting units, whereby all high tension leads and connections are enclosed by said housing means, said current supply and tube connecting units being provided with upper side projections of substantially identical dimensions, and the mounting plates having oppositely disposed channels for sliding engagement of said projections whereby to support an entire unit of either type.

13. In a system of the character described, a plurality of mounting plates attachable at uniform distances to a ceiling, at least one current supply unit attached to a mounting plate, said unit having a transformer with primary and secondary windings, at least one tube connecting unit attached to a mounting plate, said tube connecting unit being so constructed and arranged as to support and interconnect at least one pair of tubes, a pair of tubes with terminal contacts disposed in parallel relation, means for supporting said tubes on the current supply unit to establish a series circuit including the secondary of the transformer, said tubes and the tube connecting unit, housing means enclosing the current supply and tube connecting units whereby all high tension leads and connections are enclosed by said housing means, and means for de-energizing high tension circuits as an incident to removing a supply unit housing member.

14. In a system of the character described, a plurality of mounting plates attachable at uniform distances to a ceiling, at least one current supply unit attached to a mounting plate, said unit having a transformer with primary and secondary windings, at least one tube connecting unit attached to a mounting plate, a pair of tubes with terminal contacts disposed in parallel relation, means for supporting and forming electrical connections for said tubes on the current supply and tube connecting units whereby to establish a series circuit including the secondary of the transformer and said pair of tubes, and housing means enclosing the current supply and tube connecting units whereby all high tension leads and connections are enclosed by said housing means.

15. In a system of the character described, a plurality of mounting plates attachable at uniform distances to a ceiling, at least one current supply unit attached to a mounting plate, said unit having a transformer with primary and secondary windings, at least one tube connecting unit attached to a mounting plate, a pair of tubes with terminal contacts disposed in parallel relation, means for supporting and forming electrical connections for said tubes on the current supply and tube connecting units whereby to establish a series circuit including the secondary of the transformer and said pair of tubes, and housing means enclosing the current supply and tube connecting units whereby all high tension leads and connections are enclosed by said housing means, there being two tubes for each combination of one current supply unit and one tube connecting unit.

16. In a system of the character described, a current supply unit, a tube connecting unit and at least one tube supported between said units, the supporting means comprising on one unit a longitudinally disposed compressible spring forming a contact, and means associated with said spring for mechanically supporting one end of a tube, and on the other unit a spring clip for mechanically supporting one end of a tube, and forming an electrical connection therefor, whereby a relatively long tube is readily electrically associated with its circuit by engaging one extending end longitudinally against said spring, and attaching an adjacent end to a spring clip.

17. In a system of the character described, a plurality of mounting plates attachable at uniform distances to a ceiling, at least one current supply unit attached to a mounting plate, said unit having a transformer with primary and secondary windings, at least one tube connecting unit attached to a mounting plate, a pair of tubes with terminal contacts disposed in parallel relation, means for supporting said tubes on the current supply and tube connecting units whereby to establish a series circuit including the secondary of the transformer and said pair of tubes, and housing means enclosing the current supply and tube connecting units whereby all high tension leads and connections are enclosed by said housing means, said supporting means comprising two tube sockets on the tube connecting unit, each having a longitudinally compressible spring, and said springs being electrically connected, and a pair of clips carried by the current supply unit connected to the secondary of the transformer.

18. In a system of the character described, a plurality of mounting plates attachable at uniform distances to a ceiling, at least one current supply unit attached to a mounting plate, said unit having a transformer with primary and secondary windings, at least one tube connecting unit attached to a mounting plate, a pair of tubes with terminal contacts disposed in parallel relation, means for supporting said tubes on the current supply and tube connecting units whereby to establish a series circuit including the secondary of the transformer and said pair of tubes, and housing means enclosing the current supply and tube connecting units whereby all high tension leads and connections are enclosed by said housing means, said supporting means comprising two tube sockets on the tube connecting unit, each having a longitudinally compressible spring, and said springs being electrically connected, a pair of clips carried by the current supply unit connected to the secondary of the transformer, the mounting plates having a pair of mounting rails, and all units having projections arranged to permit slidable connections between the mounting plates and units, whereby the system is readily installed by attaching the mounting plates at uniform distances, attaching to the mounting plates at alternate positons, current supply units and tube connecting units, securing in position two parallel tubes for each combination of a current supply unit and a tube connecting unit, and attaching the housings to produce a finished appearance and enclose all parts carrying high voltage.

19. A system as defined in claim 18, including means for de-energizing high tension circuits as an incident to the removal of a supply unit housing member.

20. In a system of the character described, a plurality of mounting plates attachable at uniform distances to a ceiling, at least one current supply unit attached to a mounting plate, said unit having a transformer with a primary winding and at least one secondary winding, at least one tube connecting unit attached to a mounting plate, a pair of tubes with terminal contacts disposed in parallel relation, means for supporting said tubes on the current supply and tube connecting units whereby to establish a series circuit including the secondary of the transformer and said pair of tubes, and housing means enclosing the current supply and tube connecting units whereby all high tension leads and connections are enclosed by said housing means, the current supply unit comprising a transformer casing housing the said transformer, means forming a part of the casing for ready attachment thereof to a mounting plate, and spaced clips arranged in pairs for support of a pair of tubes, said clips electrically connected to secondary transformer windings, there being a pair of clips for each secondary winding in the current supply unit, and said clips being mounted on opposite sides of the casing as determined by the direction which tubes extend which are to be electrically connected to a source of current supply by attachment to said clips.

21. In a system of the character described, a plurality of mounting plates having mounting rails for attachment of tube carrying units, current supply and tube connecting units having uniform attaching projections rendering them attachable at any position to a mounting plate, and tubes arranged in pairs supported between adjacent units of different types.

22. In a system of the character described, a plurality of mounting plates having mounting rails for attachment of tube carrying units, current supply and tube connecting units having uniform attaching projections rendering them attachable at any position to a mounting plate, and tubes arranged in pairs supported between adjacent units of different types, said current supplying unit supplying high voltage current to a pair of tubes, and said tube connecting units forming cross electrical connections to the same pair of tubes, whereby circuits include two tubes in series and there are no secondary high tension leads running between the units.

23. In a lighting system employing high voltage luminescent tubes mounted at or near a ceiling, a mounting plate attachable to the ceiling, a transformer having a primary and secondary winding releasably supported by the mounting plate, a housing supported by the mounting plate, and entirely enclosing said transformer, a pair of clips carried by the transformer and electrically connected to terminals of the secondary thereof, a tube looped upon itself to form a U with two parallel straight portions and a curved portion, ends of the tubes having terminals contiguous to each other, said terminals supported by said clips whereby to supply secondary voltage to the tube, the major portion of said tube being outside of said housing, and means engaging said curved portion of the tube to support that portion extending outside of the said housing.

24. In a lighting system employing high voltage luminescent tubes mounted on or near a ceiling, a mounting plate attachable to the ceiling, said mounting plate provided with a pair of top rails whereby to space the plate from the ceiling, a pair of rails on the mounting plate defining a pair of oppositely disposed channels, a transformer having a casing shaped to engage in such channels by a sliding action, said transformer having a primary winding and at least one secondary winding, tube mounting clips carried by the transformer casing, one secured to each terminal of each secondary winding, tubes having terminal contacts secured to the clips whereby to support one end of said tubes and supply secondary voltage thereto, a housing enclosing the transformer and said clips, said tubes projecting from said housing, and means separate from said housing for supporting that portion of the tubes extending therefrom, and means exterior of said housing for connecting projecting end terminals of said tubes whereby to connect said tubes in the same series circuit.

CHARLES A. POLLAK.
RUDOLPH C. HULTGREN.